(12) United States Patent
Fan et al.

(10) Patent No.: US 7,309,454 B2
(45) Date of Patent: Dec. 18, 2007

(54) UV-EMITTING STRONTIUM BORATE PHOSPHOR WITH IMPROVED HOLDOVER STABILITY

(75) Inventors: Chen-Wen Fan, Sayre, PA (US); Thomas M. Snyder, Laceyville, PA (US); Eric A. Thomason, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 373 days.

(21) Appl. No.: 10/908,002

(22) Filed: Apr. 25, 2005

(65) Prior Publication Data

US 2006/0237689 A1 Oct. 26, 2006

(51) Int. Cl.
*C09K 11/63* (2006.01)
(52) U.S. Cl. .................. 252/301.4 R; 252/301.4 F; 427/403; 427/404; 427/212; 427/215
(58) Field of Classification Search ......... 252/301.4 R, 252/301.4 F; 428/403, 404; 427/212, 215
See application file for complete search history.

(56) References Cited

U.S. PATENT DOCUMENTS

| 4,585,673 A | 4/1986 | Sigai ......................... 427/213 |
|---|---|---|
| 4,684,539 A | 8/1987 | Chenot et al. ................ 427/64 |
| 4,710,674 A | 12/1987 | Sigai ........................... 313/489 |
| 4,797,594 A | 1/1989 | Sigai et al. .................. 313/488 |
| 4,825,124 A | 4/1989 | Sigai ........................... 313/486 |
| 5,223,341 A | 6/1993 | Sigai ........................... 428/403 |
| 5,417,886 A | 5/1995 | Tateiwa et al. ....... 252/301.4 R |
| 5,433,888 A | 7/1995 | Okada et al. ......... 252/301.4 R |
| 5,523,018 A | 6/1996 | Okada et al. ......... 252/301.4 P |
| 5,695,685 A | 12/1997 | Chau ................... 252/301.4 R |
| 6,602,617 B1 * | 8/2003 | Justel et al. ................ 428/690 |

FOREIGN PATENT DOCUMENTS

| EP | 1571692 | 9/2005 |
| WO | WO 2004066334 | 8/2004 |

* cited by examiner

*Primary Examiner*—C. Melissa Koslow
(74) *Attorney, Agent, or Firm*—Robert F. Clark

(57) ABSTRACT

A UV-emitting phosphor comprising $SrB_4O_7$:Eu phosphor particles that have been treated to yield a surface layer containing from greater than 0 to about 25 atomic percent aluminum. The holdover stability of the treated $SrB_4O_7$:Eu phosphor improves the 100-hour maintenance in a fluorescent tanning lamp to the extent that the treated phosphor may be subject to a holdover period of more than 25 days without a significant change in its 100-hour maintenance.

14 Claims, 2 Drawing Sheets

UV-EMITTING STRONTIUM BORATE PHOSPHOR WITH IMPROVED HOLDOVER STABILITY

TECHNICAL FIELD

This invention relates to europium-activated strontium borate phosphors, which are ultraviolet (UV)-emitting phosphors typically used in low-pressure mercury discharge lamps for skin tanning purposes. More particularly, this invention relates to improving the holdover stability of these phosphors in aqueous coating suspensions.

BACKGROUND OF THE INVENTION

Ultraviolet (UV)-emitting phosphors are used in fluorescent lamp applications for skin tanning where both UVA and UVB radiation is needed. UVA is defined by the U.S. Food & Drug administration (FDA) as radiation from 320 nm to 400 nm and UVB is defined as radiation from 260 nm to 320 nm. UV-emitting phosphor is applied to the interior surface of the lamp envelope by a conventional fluorescent lamp manufacturing process. Typically, phosphor is suspended in a liquid medium together with a binder and one or more of a dispersing agent, an adhesive material, and a wetting agent. The phosphor suspension is then flowed through the tubes to coat the interior surface and then the tubes are heated to burn out the binder material. Fluorescent lamp manufacturers prefer water-based coating suspensions to organic-based suspensions because of environmental issues with the organic solvents. It is desirable to make the coating suspensions in large quantities to be held in tanks over a period of several days. However, in some instances, the "holdover" of the phosphor coating suspension can cause problems with lamp performance.

The most commonly used UVA-emitting phosphor is a lead-activated barium disilicate, $BaSi_2O_5$:Pb, which has its emission maximum at 351 nm. The main drawback of this phosphor is its low stability in water-based binder suspensions, which results in a low output maintenance in tanning lamps. This deficiency is often addressed by coating the surface of the barium disilicate phosphor with a protective material such as aluminum oxide. For example, OSRAM SYLVANIA Type GS201X, a commercial $BaSi_2O_5$:Pb phosphor, has good stability in water-based coating suspensions because of a conformal aluminum oxide coating that has been applied to the surface of each individual phosphor particle via a chemical vapor deposition (CVD) technique in a fluidized bed. Such coating techniques are described in U.S. Pat. Nos. 4,585,673, 4,710,674, 4,797,594, 4,825,124, and 5,223,341.

Europium-activated strontium borate, $SrB_4O_7$:Eu, is another common UVA-emitting phosphor, which has a peak UV emission at 371 nm. In order to extend the range of emitted UV wavelengths to 380 nm, many suntan lamp manufacturers incorporate $SrB_4O_7$:Eu as a second UVA-emitting phosphor in a blend with $BaSi_2O_5$:Pb. The phosphor blend ratio of $SrB_4O_7$:Eu generally ranges from 5 wt. % to 30 wt. %. Like the $BaSi_2O_5$:Pb phosphor, a drawback of using a $SrB_4O_7$:Eu phosphor in tanning lamps is its low holdover stability in water-based coating suspensions. The $SrB_4O_7$:Eu phosphor typically leaches borate anions and strontium cations into the aqueous coating solution during the holdover period. Therefore, its radiance maintenance in a fluorescent tanning lamp is poor, i.e., tanning lamps employing the $SrB_4O_7$:Eu phosphor from water-based suspensions exhibit a relatively large decrease in radiant output over time. In addition, the presence of borate anions in the aqueous phase can lead to weakening of the glass bulb after drying and baking of the coating. To obviate these disadvantages of using $SrB_4O_7$:Eu phosphor from water-based suspensions in lamps, a protective layer of coating on phosphor surface becomes necessary.

As described above, the prior art method of applying an aluminum oxide coating via CVD is effective in dealing with the holdover problem in the case of $BaSi_2O_5$:Pb phosphors. However, this solution requires relatively complex coating equipment and hazardous chemicals and may unacceptably increase the cost of the phosphor. Thus, it would be advantageous to have a simpler, more economical method for protecting $SrB_4O_7$:Eu phosphors and improving their stability in aqueous coating suspensions.

SUMMARY OF THE INVENTION

It is an object of this invention to obviate the disadvantages of the prior art.

It is another object of the invention to provide a $SrB_4O_7$:Eu phosphor that may be subject to a holdover period of at least about 25 days in an aqueous coating suspension without adversely affecting its lamp performance properties.

In accordance with one aspect of the invention, there is provided a UV-emitting phosphor comprising $SrB_4O_7$:Eu phosphor particles having a surface layer containing from greater than 0 to about 25 atomic percent aluminum. The phosphor preferably contains from about 1 to about 8 weight percent aluminum oxide, more preferably from about 2 to about 4 weight percent aluminum oxide, and even more preferably about 4 weight percent aluminum oxide.

In accordance with another aspect of the invention, there is provided a UV-emitting phosphor blend comprising at least a $SrB_4O_7$:Eu phosphor, the phosphor blend after being subjected to a holdover period in an aqueous coating suspension of at least 25 days exhibiting a 100-hour maintenance that is substantially the same as the 100-hour maintenance of the phosphor blend before the holdover period. Preferably, the UV-emitting phosphor blend contains about 10 to about 20 weight percent of the $SrB_4O_7$:Eu phosphor. The balance of the phosphor blend may be an alumina-coated $BaSi_2O_5$:Pb phosphor.

In accordance with yet another aspect of the invention, there is provided a method of treating a $SrB_4O_7$:Eu phosphor. The method comprises:

(a) mixing the phosphor in an aqueous solution containing aluminum ions to form a treated phosphor;

(b) separating the treated phosphor from the solution;

(c) blending the treated phosphor with a high surface area aluminum oxide powder to form a mixture, the high surface area aluminum oxide powder having a surface area of at least about 60 $m^2/g$;

(d) heating the mixture at a temperature from about 400° C. to about 600° C.

Preferably, the aqueous solution has an aluminum ion concentration of at least about 0.01 moles per liter, and more preferably the aqueous solution has an aluminum ion concentration of from about 0.01 to about 0.05 moles per liter.

DETAILED DESCRIPTION OF THE INVENTION

Figure 1:
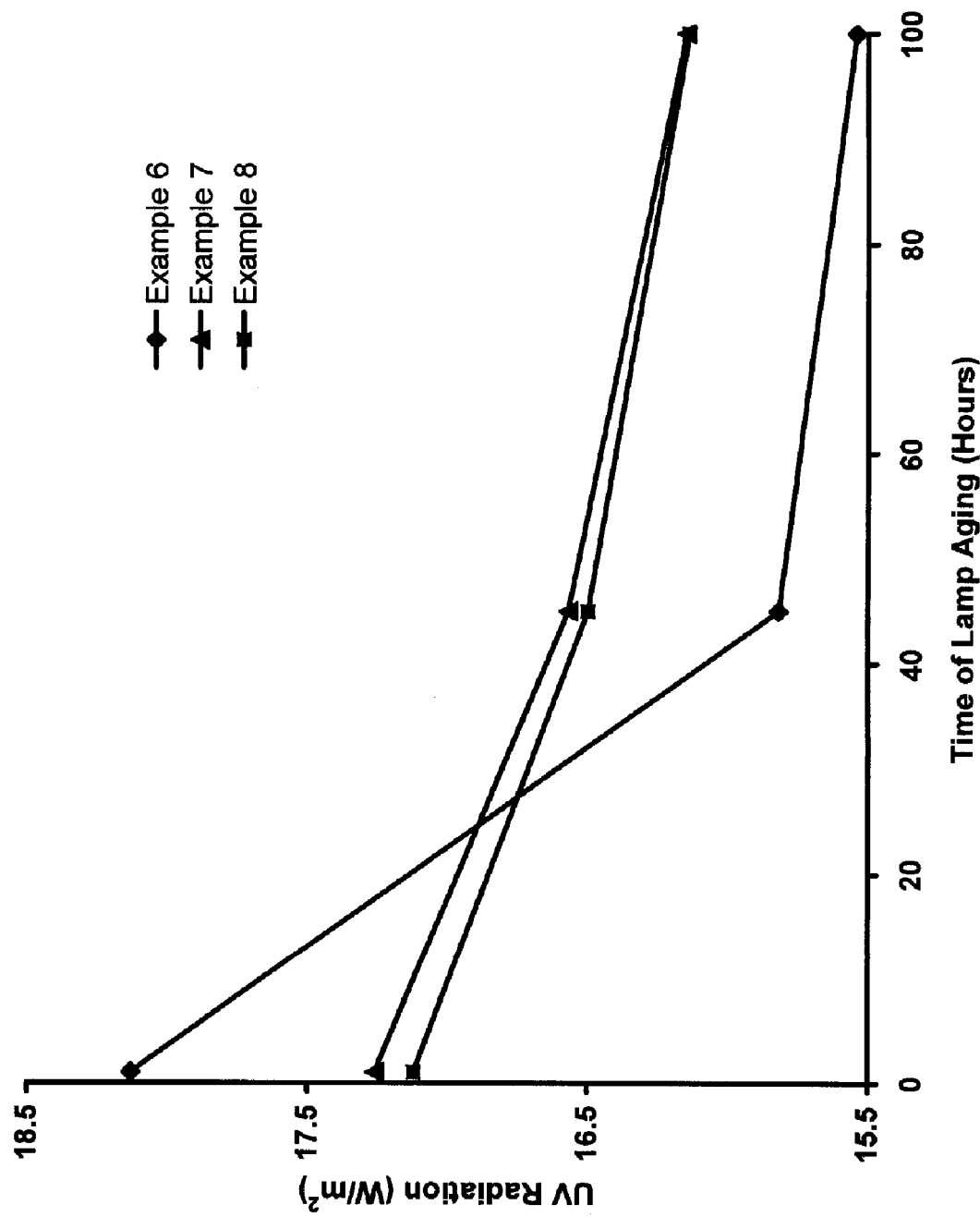
FIG. 1 is a graphical representation of the UV radiation of fluorescent lamps incorporating the treated $SrB_4O_7$:Eu phosphor of this invention as a function of lamp operation times.

For a better understanding of the present invention, together with other and further objects, advantages and capabilities thereof, reference is made to the following disclosure and appended claims taken in conjunction with the above-described drawings.

It has been discovered that a $SrB_4O_7$:Eu phosphor treated with aluminum ions in aqueous solution and annealed with a high surface area aluminum oxide (alumina) powder significantly enhances the holdover stability of the phosphor in aqueous coating solutions and improves the 100-hour radiance output maintenance in a fluorescent tanning lamp. As used herein, holdover stability refers to the stability of the phosphor when suspended in an aqueous coating suspension for more than a 24-hour period. In particular, the holdover stability of the treated phosphor of this invention has improved the 100-hour maintenance of the $SrB_4O_7$:Eu phosphor to the extent that the treated phosphor may be subject to a holdover period of more than 25 days without a significant change in its 100-hour maintenance in a fluorescent tanning lamp.

After treatment in the solution of aluminum ions, an aluminum-containing surface layer is created on the surface of the $SrB_4O_7$:Eu phosphor particles. This presence of $Al^{3+}$ ions in the surface layer is believed to change the electronic structure of the surface by filling trap levels with their additional electrons. These trap levels are present between the conduction and valence bands that are intrinsic to the lattice. Although it is believed that the $Al^{3+}$ ions are substituting into an $Sr^{2+}$ site in the lattice at the exposed surface layers, it is possible that the at least some of the aluminum ions could also be chemically binding themselves to other surface atoms to form the aluminum-containing surface layer.

The present invention is a $SrB_4O_7$:Eu phosphor having a protective aluminum-containing surface layer. Mixing $SrB_4O_7$:Eu phosphor in an aqueous solution containing $Al^{3+}$ ions forms this coating layer. The aqueous solution preferably is made with aluminum nitrate. However, other soluble aluminum salts, such as aluminum chloride and aluminum ammonium tetrachloride, may also reasonably be used within the context of the present invention. The amount of aluminum is about 0.01 to about 0.5 moles per liter of water, and preferably about 0.1 mole/liter. On the other hand, the amount of phosphor is about 2.0 to about 8.0 moles per liter of slurry, and preferably about 4.0 moles. Alternatively, the phosphor is mixed with the aqueous solution in a ratio of about 0.00125 to about 0.25 moles of Al ions per mole of phosphor.

Mixing can be carried out at any reasonable solution temperature. The mixture is stirred for 10 to 60 minutes with 30 minutes being the preferred length of time. The aluminum-treated $SrB_4O_7$:Eu phosphor is then separated from the liquor by filtration and dried at 110° C. for 4 to 6 hours. The resulting dried and screened phosphor is then mixed with about 1.0 to about 8.0 wt. % of a high surface area aluminum oxide powder (e.g. Aluminum Oxide C from Degussa AG with a surface area of about 100 m²/g) in a V-blender with the intensity bar for 15 to 30 minutes. The treated phosphor is finally annealed in air at temperatures from about 400° C. to about 600° C., and preferably about 500° C., for a period of time ranging from about 1 to about 5 hours, and more preferably about 1 to about 3 hours. A higher annealing temperature or a longer annealing time may oxidize the $Eu^{2+}$ activator and result in the loss of phosphor brightness.

The present invention will be described in further detail with reference to the following examples. However, it should be understood that the present invention is by no means restricted to such specific examples.

EXAMPLE 1

A solution of aluminum nitrate was prepared by dissolving 12 grams of $Al(NO_3)_3 \cdot 9H_2O$ into 1.0 liter of deionized (DI) water. About 333 grams of $SrB_4O_7$:Eu phosphor (Type2052, manufactured by OSRAM SYLVANIA Products Inc., Towanda, Pa.) was mixed with the aluminum nitrate solution and continuously stirred for 30 minutes at room temperature. After settling, the supernate was decanted and the slurry was filtered. The treated phosphor was dried at 110° for 5 hours and then sifted through the 200-mesh screen.

EXAMPLE 2

The phosphor in this example was prepared by dry-blending 60 grams of the phosphor prepared in Example 1 with 1.2 grams (2.0 wt. %) a high surface area alumina powder in a vibrated mixer for 20 minutes.

EXAMPLE 3

The phosphor in this example was prepared by dry-blending 60 grams of the phosphor prepared in Example 1 with 2.4 grams (4.0 wt. %) of a high surface area alumina powder in a vibrated mixer for 20 minutes.

EXAMPLE 4

The phosphor in this example was prepared by dry-blending 60 grams of the phosphor prepared in Example 1 with 4.8 grams (8.0 wt. %) of a high surface area alumina powder in a vibrated mixer for 20 minutes.

The surface compositions of the aluminum-treated $SrB_4O_7$:Eu phosphor with or without additional the high surface area alumina are compared to that of untreated $SrB_4O_7$:Eu phosphor in Table 1. X-ray photoelectron spectroscopy (XPS) was used to measure the surface compositions which are given in atomic percent (at. %). The presence of the aluminum-containing surface layer on the solution-treated $SrB_4O_7$:Eu phosphor (Example 1) is evidenced by the presence of 1.4 atomic percent aluminum and the reduction in the surface concentrations of strontium, boron, and europium. The data also shows the increase of Al and decrease of Sr, B, and Eu as the amount of alumina added to the phosphor blend is increased from 0 to 8 wt. %.

Phosphor samples prepared in the above examples were packed into plaques and excited by 254 nm radiation from a mercury discharge. The emission of each sample was measured from 270 to 400 nm and the area under this region calculated. The results shown in Table 1 show that the decrease in relative brightness is proportional to the amount of alumina added to the phosphor. A comparison of Examples 3 and 4 indicates that little additional coverage of the phosphor surface is gained by increasing the alumina addition from 4 to 8 wt. %.

TABLE 1

| Sample | Relative Brightness, % | Surface Area, m²/g | Sr, at. % | B, at. % | O, at. % | Eu, at. % | Al, at. % |
|---|---|---|---|---|---|---|---|
| Untreated $SrB_4O_7$:Eu | 100 | 0.42 | 8.9 | 30 | 58 | 2.9 | ND |
| Example 1 (0 wt. % $Al_2O_3$) | 99.4 | 0.74 | 8.5 | 29 | 58 | 2.7 | 1.4 |
| Example 2 (2 wt. % $Al_2O_3$) | 97.3 | 3.33 | 5.9 | 20 | 59 | 1.7 | 13 |
| Example 3 (4 wt. % $Al_2O_3$) | 95.9 | 5.82 | 4.1 | 13 | 61 | 1.2 | 21 |
| Example 4 (8 wt. % $Al_2O_3$) | 89.0 | 10.5 | 3.2 | 9.6 | 61 | 0.9 | 25 |

EXAMPLE 5

One kilogram of $SrB_4O_7$:Eu phosphor was mixed for 30 minutes at room temperature in 3.0 liter of deionized water containing 36 grams of $Al(NO_3)_3.9H_2O$. The treated phosphor was removed by filtering and dried at 110° for 5 hours. Following sifting through a 200-mesh screen, the treated phosphor was dry-blended with 4.0 wt. % of a high surface area alumina in a V-blender for 20 minutes. The blended phosphor was then annealed in an open silica crucible at 500° C. for 1.0 hour. After cooling, the resulting cake was sifted again through a 200-mesh screen. The surface composition of this finished phosphor is compared to that of untreated $SrB_4O_7$:Eu phosphor. The test results for Example 5 compare well to those of Example 3 (also 4.0 wt. % alumina).

TABLE 2

| Sample | Relative Brightness, % | Surface Area, m²/g | Sr, at. % | B, at. % | O, at. % | Eu, at. % | Al, at. % |
|---|---|---|---|---|---|---|---|
| Untreated $SrB_4O_7$:Eu | 100 | 0.42 | 8.9 | 30 | 58 | 2.9 | ND |
| Example 5 | 96.7 | 5.66 | 3.8 | 12 | 61 | 1.3 | 21 |

EXAMPLE 6

A phosphor blend with 90 wt. % of an alumina-coated $BaSi_2O_5$:Pb phosphor (Type GS201X from OSRAM SYLVANIA) and 10 wt. % of a commercially available (untreated) $SrB_4O_7$:Eu phosphor was prepared and mixed in an aqueous coating suspension that was continuously stirred for 16 days. Test lamps were made with the coating suspension following the 16-day holdover period.

EXAMPLE 7

A phosphor blend with 80 wt. % of GS201X and 20 wt. % of surface-treated $SrB_4O_7$:Eu phosphor prepared in Example 5 was mixed in a similar aqueous coating suspension and continuously stirred for several hours. Test lamps were coated within the first 24 hours of making the suspension so that there was no holdover period for this phosphor suspension.

EXAMPLE 8

The phosphor blend in this example was prepared exactly as in Example 7, except that phosphor was continuously stirred in the coating suspension for 26 days. Test lamps were made after the 26-day holdover period.

Standard 160W F72T12 VHR fluorescent tanning lamps were used for testing the phosphor blends of Examples 6-8. The performance of the test lamps are compared in Table 3. The initial UV output (1 hour) of the lamps containing the treated phosphor (Examples 7 and 8) was somewhat lower which can be expected given the relative brightness data in Table 1. Also, the UV radiance of the $SrB_4O_7$:Eu phosphor is typically 10% lower than the GS201X and the blend in Example 6 contained only 10 wt. % $SrB_4O_7$:Eu compared to 20 wt. % in Examples 7 and 8.

The UV output after 45 and 100 hours of operation was better for the lamps made with the treated phosphor. This can be further represented in terms of lamp maintenance. In particular, the 45-hour maintenance is defined as the 45-hour irradiance output divided by the 1-hour irradiance output and multiplied by 100% ((45 hour/1 hour)×100%). Similarly, the 100-hour maintenance is defined as (100 hour/1 hour)×100%.

TABLE 3

| Sample | Output (W/m²) 1 Hour | Output (W/m²) 45 Hour | Output (W/m²) 100 Hour | Maint. (%) 45 Hour | Maint. (%) 100 Hour |
|---|---|---|---|---|---|
| Example 6 | 18.13 | 15.82 | 15.54 | 87.3 | 85.7 |
| Example 7 | 17.26 | 16.57 | 16.15 | 96.1 | 93.6 |
| Example 8 | 17.12 | 16.50 | 16.14 | 96.4 | 94.3 |

Figure 2:
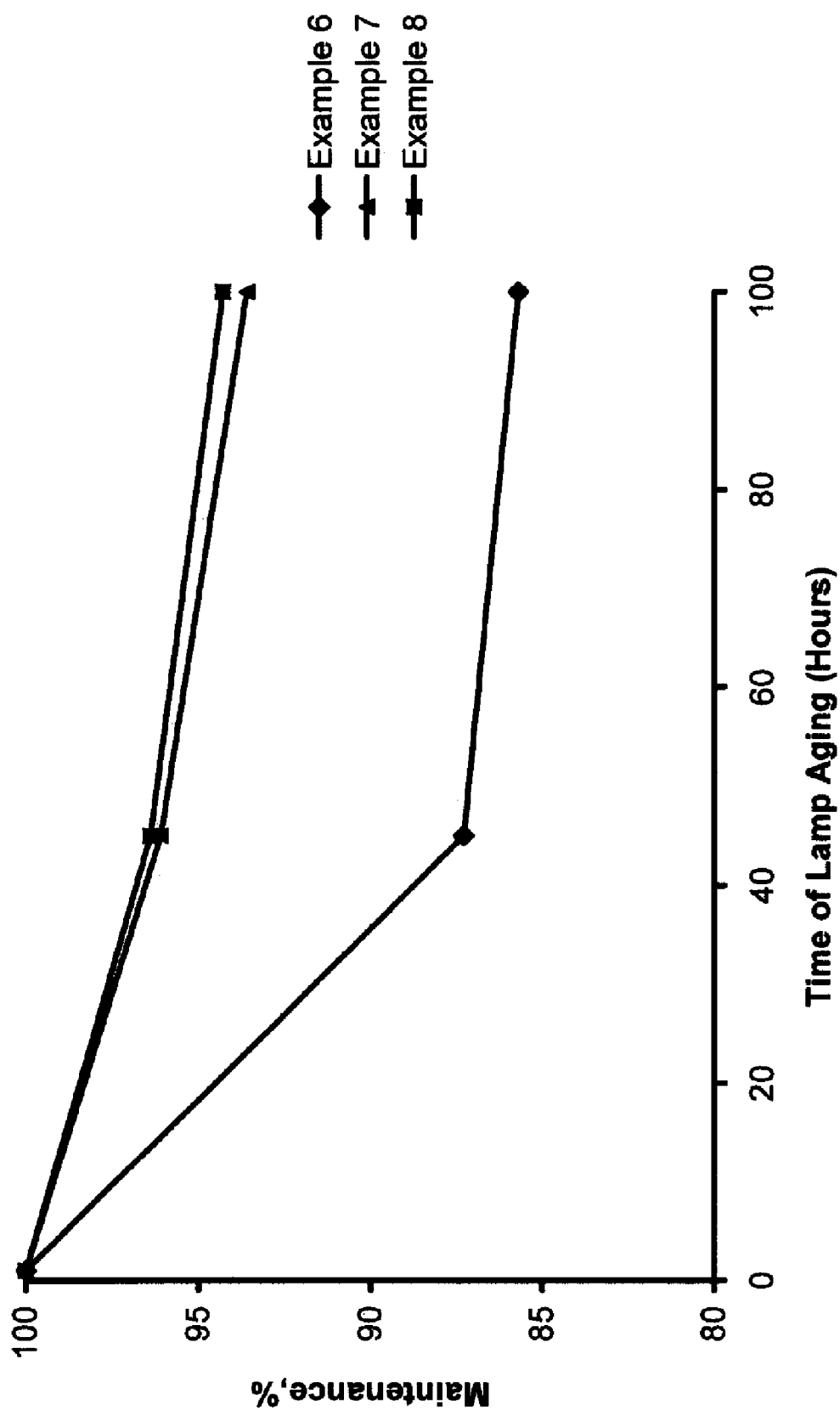
FIG. 2 is a graphical representation of the maintenance of fluorescent lamps incorporating the treated $SrB_4O_7$:Eu phosphor of this invention as a function of lamp operation times.

The UV irradiance measurements of these test lamps were plotted versus the time of lamp operation in FIG. 1. FIG. 2 shows the lamp maintenance as a function of lamp operation time. All the lamp results shown in Table 3 and FIGS. 1 and 2 demonstrate that the phosphor treated by this invention exhibits an excellent stability in aqueous coating suspensions for up to 26 days of holdover. There is essentially no difference in the 100 hour irradiance output and maintenance for test lamps made with the suspensions of Example 7 (no holdover period) and Example 8 (26 day holdover period).

With regard to the phosphor blend containing the commercial $SrB_4O_7$:Eu phosphor (Example 6), the test lamp made with the phosphor blend of Example 8 exhibited a much better 100-hour maintenance despite having been subjected to 10 more days of holdover in the aqueous coating suspension and containing twice as much of the $SrB_4O_7$:Eu phosphor (20 wt. % versus 10 wt. %).

While embodiments of the present invention have been described in the foregoing specification and drawings, it is to be understood that the present invention is defined by the following claims when read in light of the specification and drawings.

What is claimed is:

1. A UV-emitting phosphor comprising $SrB_4O_7$:Eu phosphor particles having a surface layer containing from greater than 0 to about 25 atomic percent aluminum, and the phosphor containing about 1 to about 8 weight percent aluminum oxide.

2. The UV-emitting phosphor of claim 1 wherein the phosphor contains about 2 to about 4 weight percent aluminum oxide.

3. The UV-emitting phosphor of claim 1 wherein the phosphor contains about 4 weight percent aluminum oxide.

4. A UV-emitting phosphor blend comprising at least a $SrB_4O_7$:Eu phosphor comprising $SrB_4O_7$:Eu phosphor particles having a surface layer containing from greater than 0 to about 25 atomic percent aluminum, the $SrB_4O_7$:Eu phosphor containing about 1 to about 8 weight percent aluminum oxide, the phosphor blend after being subjected to a holdover period in an aqueous coating suspension of at least 25 days exhibiting a 100-hour maintenance that is substantially the same as the 100-hour maintenance of the phosphor blend before the holdover period.

5. The UV-emitting phosphor blend of claim 4 wherein the blend contains about 10 to about 20 weight percent of the $SrB_4O_7$:Eu phosphor.

6. The UV-emitting phosphor blend of claim 5 wherein the balance of the phosphor blend is an alumina-coated $BaSi_2O_5$:Pb phosphor.

7. A method of treating a $SrB_4O_7$:Eu phosphor, comprising:

(a) mixing the phosphor in an aqueous solution containing aluminum ions to form a treated phosphor;

(b) separating the treated phosphor from the solution;

(c) blending the treated phosphor with a high surface area aluminum oxide powder to form a mixture, the high surface area aluminum oxide powder having a surface area of at least about 60 $m^2/g$;

(d) heating the mixture at a temperature from about 400° C. to about 600° C.

8. The method of claim 7 wherein the aqueous solution has an aluminum ion concentration of at least about 0.01 moles per liter.

9. The method of claim 7 wherein the phosphor is mixed with the aqueous solution in a ratio of about 0.00125 to about 0.25 moles of Al ions per mole of phosphor.

10. The method of claim 7 wherein the aqueous solution has an aluminum ion concentration of from about 0.01 to about 0.05 moles per liter.

11. The method of claim 7 wherein the mixture in step (d) is heated for about 1 to about 5 hours.

12. The method of claim 7 wherein the high surface area aluminum oxide powder has a surface area of about 100 $m^2/g$.

13. The method of claim 10 wherein the mixture in step (d) is heated at about 500° C.

14. The method of claim 13 wherein the mixture is heated for about 1 to about 3 hours.

* * * * *